United States Patent [19]

Schlom et al.

[11] 4,418,527

[45] Dec. 6, 1983

[54] PRECOOLER FOR GAS TURBINES

[76] Inventors: Leslie A. Schlom, 5524 Saloma Ave.;
Michael B. Dubey, 5518 Saloma
Ave., both of Van Nuys, Calif.
91411; Andrew J. Becwar, 818 Old
Landmark La., La Canada, Calif.
91011

[21] Appl. No.: 141,759

[22] Filed: Apr. 21, 1980

[51] Int. Cl.³ .............................................. F02C 7/00
[52] U.S. Cl. ................................ 60/39.05; 60/39.53;
60/728
[58] Field of Search ................ 60/39.55, 39.05, 39.53,
60/728; 165/60; 123/542; 62/310, 311, 314;
415/116; 55/149, 152, DIG. 3, DIG. 43

[56] References Cited

U.S. PATENT DOCUMENTS

| | | | |
|---|---|---|---|
| 2,339,185 | 1/1944 | Nettel | 60/728 |
| 2,686,631 | 8/1954 | Jordan | 60/39.53 |
| 2,874,537 | 2/1959 | Scarborough | 60/39.53 |
| 3,649,469 | 3/1972 | MacBeth | 60/39.55 |
| 3,890,747 | 6/1975 | Brown | 62/311 |
| 3,978,663 | 9/1976 | Mandrin et al. | 60/728 |
| 4,023,949 | 5/1977 | Schlom et al. | 62/314 |

*Primary Examiner*—Louis J. Casaregola
*Attorney, Agent, or Firm*—Nilsson, Robbins, Dalgarn, Berliner, Carson & Wurst

[57] ABSTRACT

A system for cooling, cleaning and humidifying air entering an air breathing gas turbine. The air is first cooled on the dry side of an indirect evaporative heat exchanger and then moistened and cleaned by a fine water spray of distilled water obtained from a boiler heated with excess heat from the gas turbine and condensed by the moist cool air leaving the wet side of the heat exchanger.

2 Claims, 2 Drawing Figures

PRECOOLER FOR GAS TURBINES

FIELD OF THE INVENTION

The field of art to which this invention pertains includes the field of air filters and scrubbers for gas turbines and more particularly to the field of pre-cooling air for gas turbines.

BACKGROUND AND SUMMARY OF THE INVENTION

Conventional gas turbine power plants have large and costly intake air cleaners to remove dust and particles which would normally erode the compressor blades and turbine nozzles. The filters require frequent servicing and also impose a pressure drop in the air stream which reduces air density entering the compressor. The lower density air diminishes the power output of the system, reducing the overall efficiency of the gas turbine cycle, causing more fuel to be consumed per unit of delivered power. One means of compensating is to increase air density by cooling the air. Not only is the density of cool air increased, making the system more efficient, but combustion occurs at a lower temperature, resulting in the emission of less oxides of nitrogen ($NO_x$). Such cooling has been attempted with direct evaporative coolers which cool air by adding moisture. However, as entrained moisture evaporates, dissolved salts in the water precipitate out forming entrained dust which can erode the gas turbine parts. Other possible ways of cooling the air to increase air density such as refrigerating the air are too energy intensive to be cost effective.

This invention provides cooled, high density air at a reasonable cost that is free from particulate matter. Air is first filtered through a simple low resistance filter screen designed to remove large particles from the intake air stream. It then passes through the dry side of an indirect evaporative heat exchanger where it is sensibly cooled. Embodiments of this type of a heat exchanger are described in U.S. Pat. No. 4,023,949 by Schlom et al. Such a heat exchanger is provided with heat exchange walls having opposite exposed surfaces defining wet and dry sides. Water is applied as extended films across the wet side surfaces. Working air flowing past the water film evaporates portions of the water, cooling the water which cools the dry side by thermal conduction. The grossly filtered air stream passing through the dry side of the indirect evaporative heat exchanger is thereby sensibly cooled without added moisture. The dry cool air stream is then subjected to a fine spray of distilled water which serves to further cool the air stream, clean the air and thoroughly saturate it.

The distilled spray water is obtained from an evaporator heated by the hot turbine exhaust gases. The steam from the evaporator is passed to a condenser, and the purified water is sprayed into the inlet air. The condenser can be cooled by the cool moist air rising from the wet side of the indirect evaporative heat exchanger.

DETAILED DESCRIPTION

Figure 1:
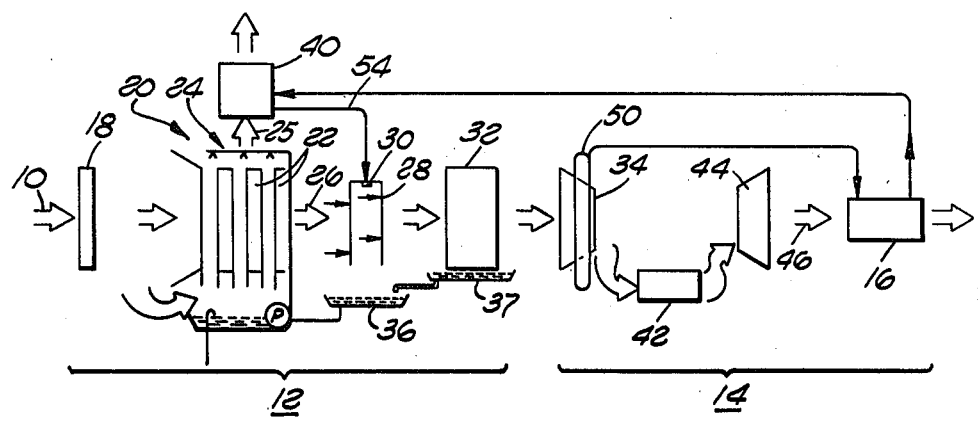
FIG. 1 is a schematic diagram of the precooler and water purification systems for a gas turbine in accordance herewith.

Referring to FIG. 1, a stream of ambient air 10 passes through a pre-cooler unit 12. The cleaned air then passes into the compressor of a gas turbine 14, the hot exhaust gases being used to heat a water boiler 16 as will be described in more detail hereinafter. More particularly, the ambient air stream first passes through a low resistance filter screen 18 which removes large particles and insects from the air stream. The air stream then passes into the dry side of an indirect evaporative heat exchanger 20 which serves to cool the air stream. The dry side air is cooled by thermal contact with conduits 22, in turn cooled by evaporation of a water film on the interior of the conduits. The interior of the conduits defines the wet side of the indirect evaporative heat exchanger. The water is supplied by water nozzles 24 at the top of the indirect evaporating heat exchanger 20. The cool dry side exhaust 26 is subjected to a fine spray of distilled water, supplied by water nozzles 30, removing any dust or small particles entrained in the dry side exhaust 26. Baffles 32 remove any particulate water in the air before the high density, cool, humidified, particle-free air enters the compressor stage 34 of the gas turbine unit 14.

Any remaining water that has not evaporated in the air stream is collected in reservoirs 36 and 37 and supplied to the indirect evaporative heat exchanger 20 where it is used to form the film of water on the interior of the conduits 22. The cool, moist air 25 exhausted from the wet side of the indirect evaporative heat exchanger provides cooling for a condenser 40 as will be described hereinafter.

At the gas turbine unit 14, air is compressed in the compressor stage 34 and passes into the combustion chamber 42 where fuel is combusted in the air and the hot combusted gases exhaust through the turbine 44. The hot exhaust gases 46 from the gas turbine are used to heat water in the boiler 16. The boiler water can be preheated by a jacket 50 around the compressor stage 34 of the gas turbine unit 14. Water vapor is directed to the condenser 40 and is liquified by the cool, moist air exhausting from the wet side of the indirect heat exchanger 20. The resultant distilled water is then supplied through an appropriate conduit 54 to the fine water spray 28 of the pre cooler unit 12.

Figure 2:
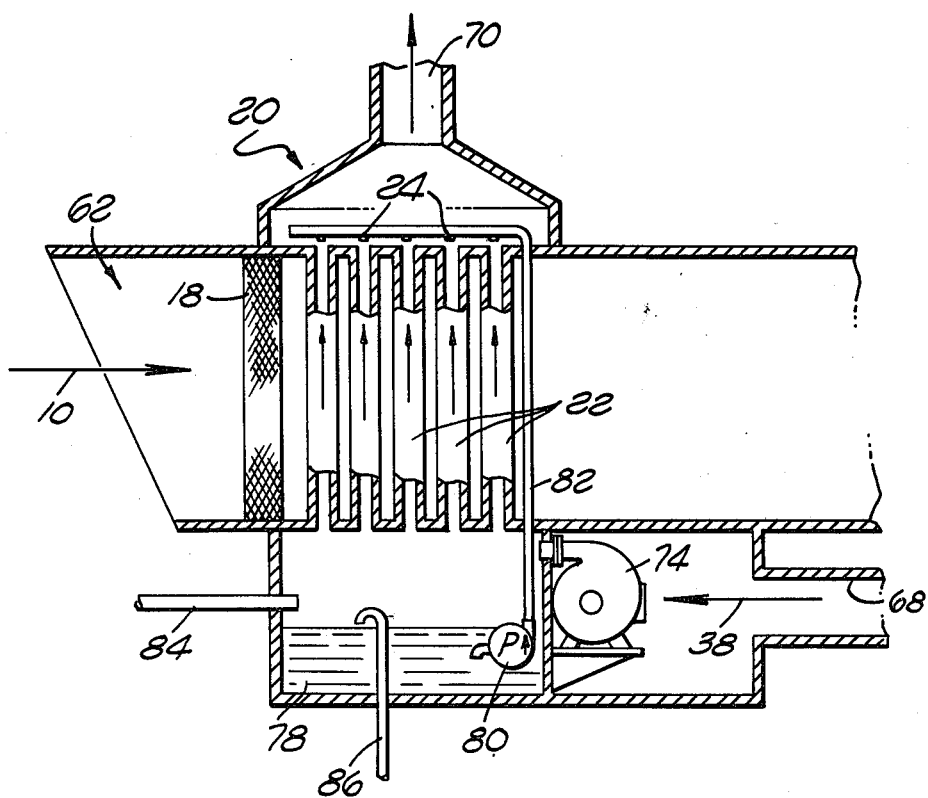
FIG. 2 is a diagrammatic elevational view of an indirect evaporating film heat exchanger for use herein of the type which has separated wet and dry sides.

FIG. 2 shows an indirect evaporating film heat exchanger 20 which has separated wet and dry sides. Ambient air 10, drawn by the gas turbine unit 14, enters a dry side input port 62, past the filter 18, is sensibly cooled and exits through a cool dry air exhaust port. Ambient air 38, drawn by a blower 74, enters the wet side input port 68, and is cooled through an evaporative process before exiting a cool moist air exhaust port 70. A water reservoir 78 if formed in the bottom of the heat exchanger and beneath conduits 22. A water pump 80 pumps water through ducting 82 to the nozzles 24 disposed over the upper ends of the conduits 22. The water in the reservoir 78 is supplied from the reservoir 36 by a supply duct 84. A water overflow tube 86 maintains the maximum volume.

Ambient air 38 entering the wet side of the indirect heat exchanger 20 is forced through the wet side of the conduits 22 by the blower 74. The temperature of inner surfaces of the conduits 22 is lowered as downwardly flowing water thereon evaporates. The temperature of the outer conduit surface is lowered through the process of thermal conduction within the conduit material itself. It is the flowing of ambient air in thermal conductive contact with the cooled outer surfaces that results in the sensible cooling of the dry side air.

The water supply for the wet side of this indirect heat exchanger may be the excess from the fine water spray, supplemented as needed by alternative water supply, since the purity of the water used in the indirect evaporative heat exchanger is not of critical importance.

The system of cooling and scrubbing air prior to intake into a gas turbine air compressor is particularly useful in locales where there is a high temperature and low relative humidity condition. The efficiency of an indirect evaporative cooler is dependent on moisture content of the wet side air because the minimum temperature achievable by the wet side air is limited by the wet bulb temperature of the ambient air.

Since the moisture content of the air cooled by the dry side of the indirect evaporative heat exchanger does not change, the addition of moisture at the fine water spray results in air entering the compression stage of the gas turbine at a temperature below the wet bulb temperature of the ambient air. This results in cooler combustion, reducing the amount of oxides of nitrogen produced in the exhaust gas, while at the same time increasing the amount of usable energy produced per unit of fuel combusted in the gas turbine unit.

As an example of work saved by this invention in hot dry conditions, assume an ambient temperature of 100° F. dry bulb/70° F. wet bulb, typical of the hot, dry conditions of many parts of the United States, and a compressor with a 20:1 compression ratio. Under this condition, the air contains 0.009 pounds of water per pound of air. The work of compression, for a 20:1 pressure ratio is 181 BTU/pound of air. If the air is cooled and moistened by the present invention it will enter the compressor at 67° F. dry bulb and 65° F. wet bulb (approximately 90° F. humidity, containing 0.0128 pounds of water per pound of air). The work required to compress air in this case is 172 BTU/pound of air, a saving of 9 BTU/pound of air or a reduction in work of approximately 5% required to compress the air.

What is claimed is:

1. Humidifier and scrubber means for cooling and washing intake air to improve the performance of a gas turbine system, said system including a combustion chamber, a turbine exhausting hot gas and an air compressor for compressing ambient air to supply the combustion chamber with compressed air, said means comprising:

an indirect evaporative heat exchanger having a dry side, a wet side and an exhaust from said wet side;
a water spray;
means for conveying ambient air through the dry side of the indirect evaporative heat exchanger to sensibly cool said air;
means for conveying said sensibly cooled air through said water spray to clean, humidify and further cool said air;
means for collecting water that has not evaporated in the air stream;
means for conveying said humidified air to said turbine air compressor;
a water purifier, comprising:
a water evaporator heated by the hot turbine exhaust, so as to distill water supplied thereto;
a condenser disposed in the path of the wet side exhaust of the indirect evaporative heat exchanger for liquifying said distilled water vapor;
means for conveying distilled water vapor from the evaporator to the condenser; and
means for conveying liquified water from the condenser to said water spray.

2. A method for cooling and cleaning ambient air for intake use in a gas turbine system, said system including a combustion chamber, a turbine exhausting hot gas and an air compressor for compressing ambient air to supply the combustion chamber with compressed air, comprising:

sensibly cooling said ambient air with an indirect evaporative heat exchanger of the type having a dry side, a wet side and an exhaust from said wet side;
evaporating water with excess heat from the gas turbine system;
condensing said evaporated water by heat transfer with the wet side exhaust from the indirect evaporative heat exchanger to form purified water for a water spray;
cleaning and further cooling adiabatically said sensibly cooled air with said water spray;
collecting water that has not evaporated in the air stream; and
directing said cooled, cleaned air to the intake of the compressor of the gas turbine.

* * * * *

UNITED STATES PATENT AND TRADEMARK OFFICE
CERTIFICATE OF CORRECTION

PATENT NO. : 4,418,527
DATED : December 6, 1983
INVENTOR(S) : Leslie A. Schlom et al It is certified that error appears in the above-identified patent and that said Letters Patent are hereby corrected as shown below:

Column 2, line 55, "if" should be --is--.

Column 3, line 33, ".009" should be --0.009--.

Column 3, line 38, ".0128" should be --0.0128--.

Signed and Sealed this

Nineteenth Day of February 1985

[SEAL]

Attest:

DONALD J. QUIGG

Attesting Officer      Acting Commissioner of Patents and Trademarks